Oct. 17, 1967  R. J. ALLEN ETAL  3,347,017
MACHINE FOR FABRICATING CONTAINERS
Original Filed Nov. 1, 1962  15 Sheets-Sheet 1

INVENTORS
ROBERT J. ALLEN
CHARLES Z. MONROE
JAMES F. EARP
HARRY B. EGLESTON

INVENTORS
ROBERT J. ALLEN
CHARLES Z. MONROE
JAMES F. EARP
HARRY B. EGLESTON

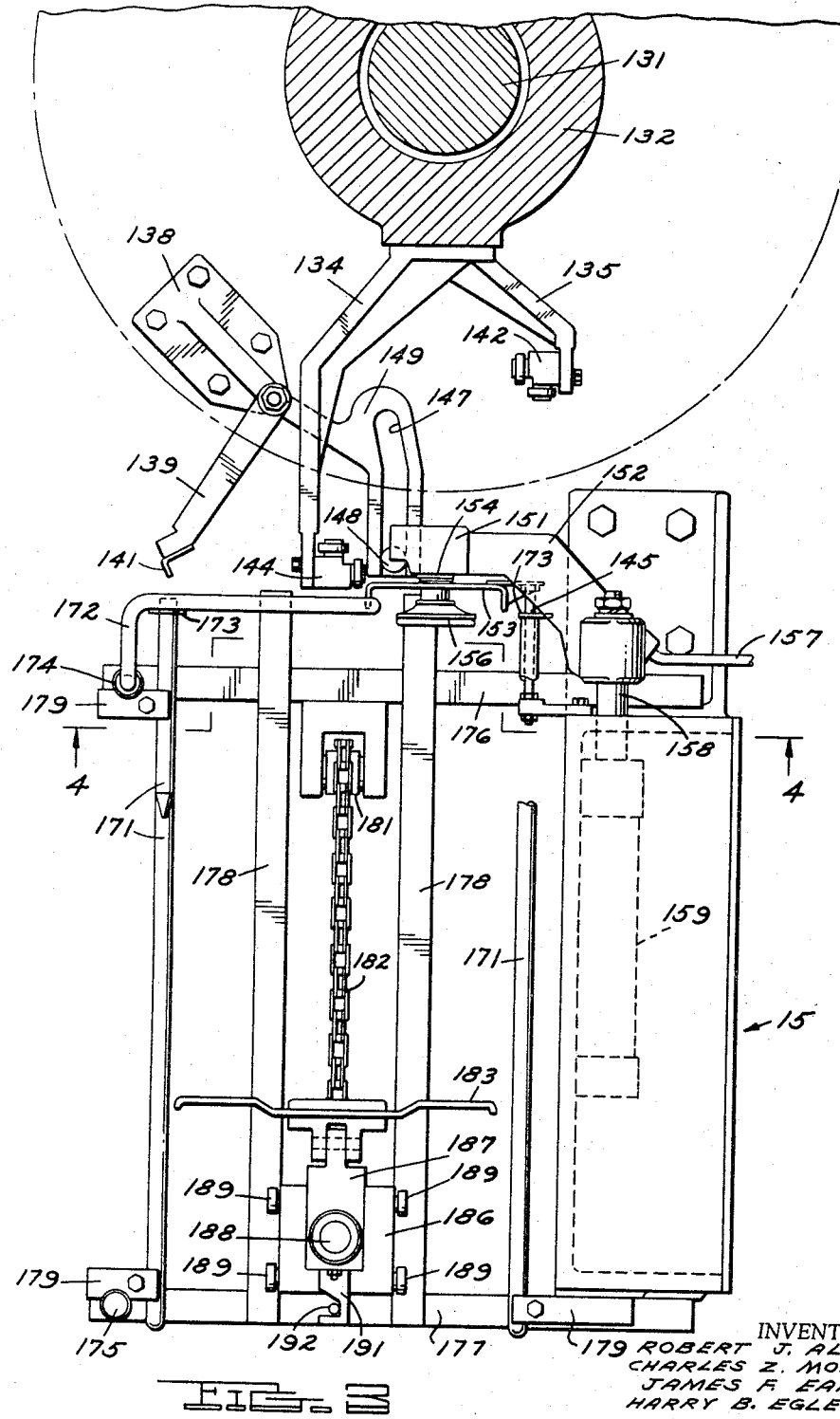

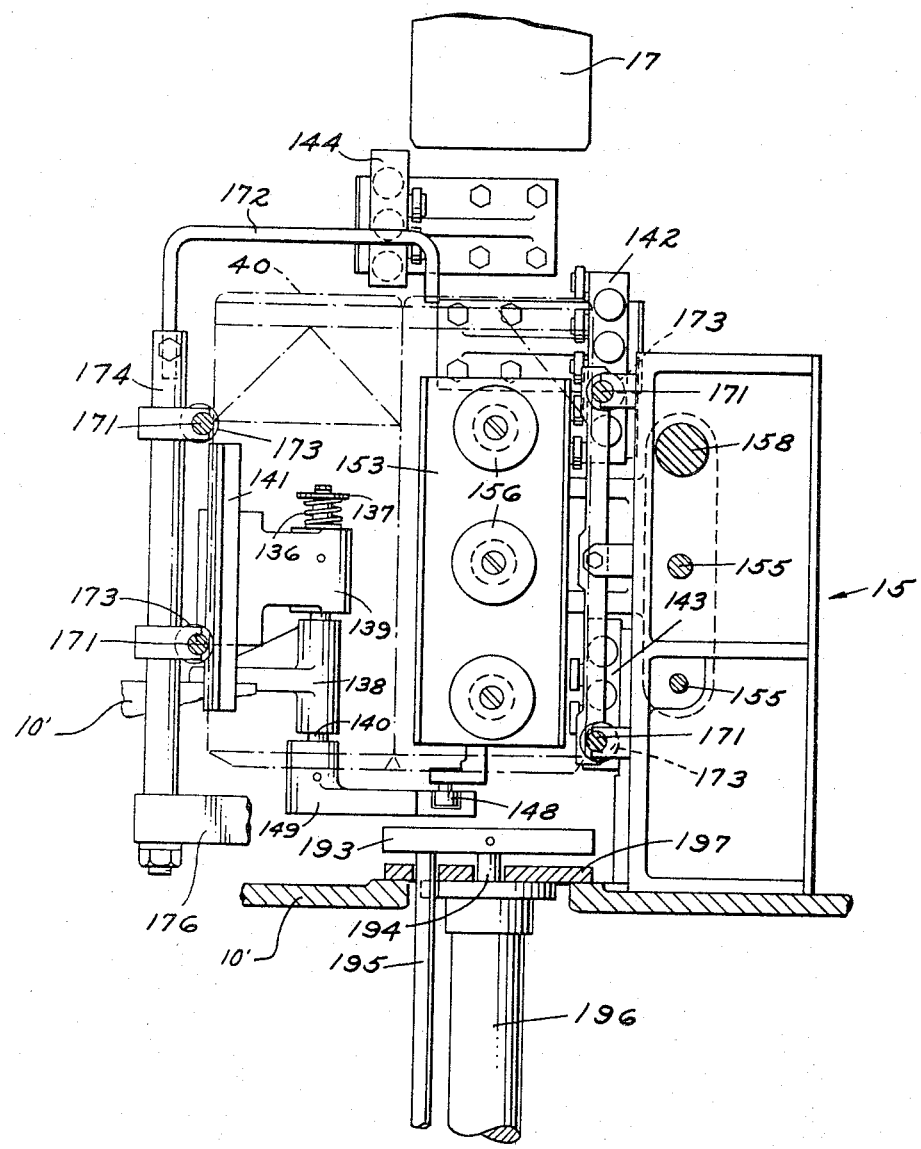

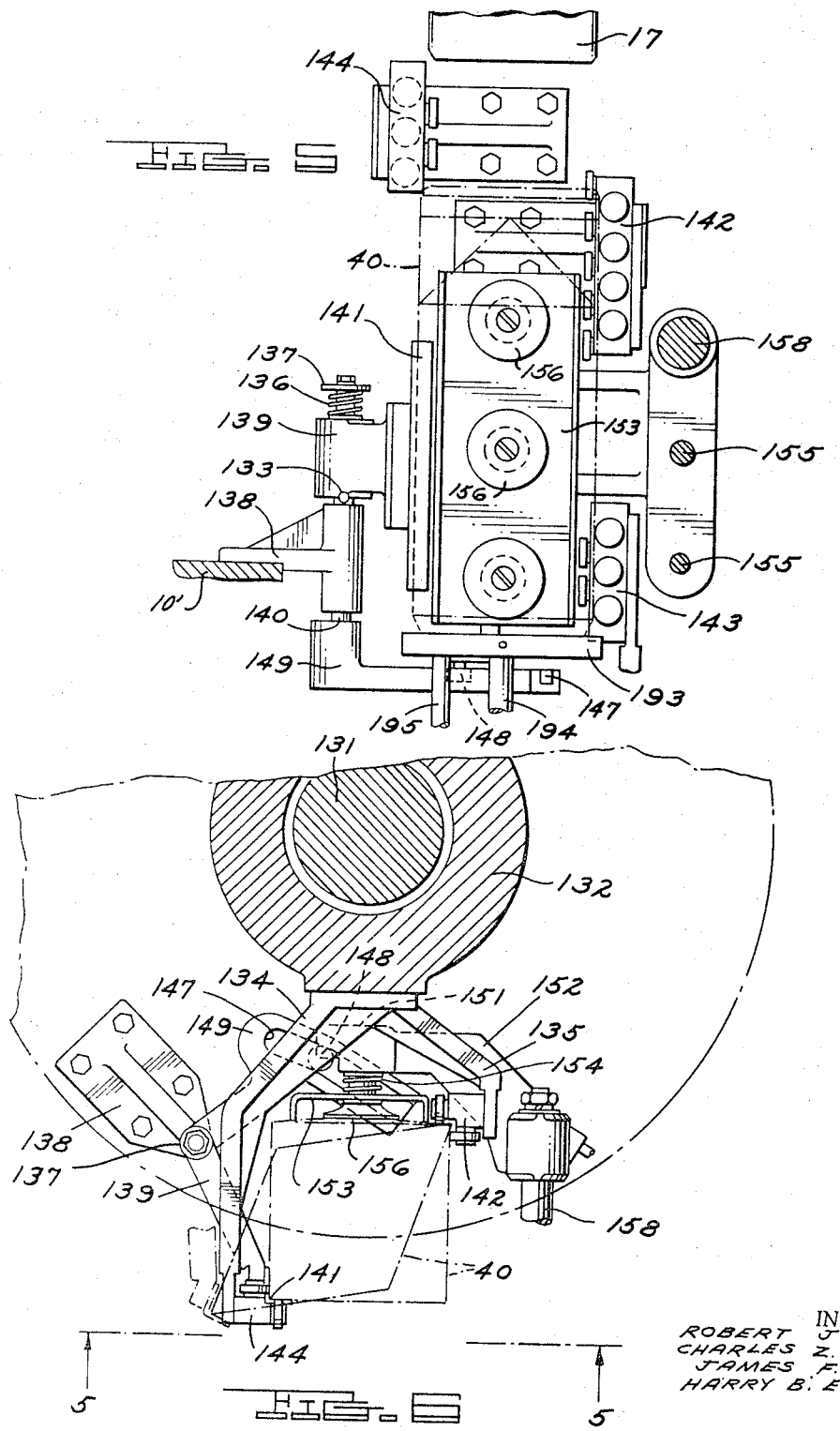

INVENTORS
ROBERT J. ALLEN
CHARLES Z. MONROE
JAMES F. EARP
HARRY B. EGLESTON

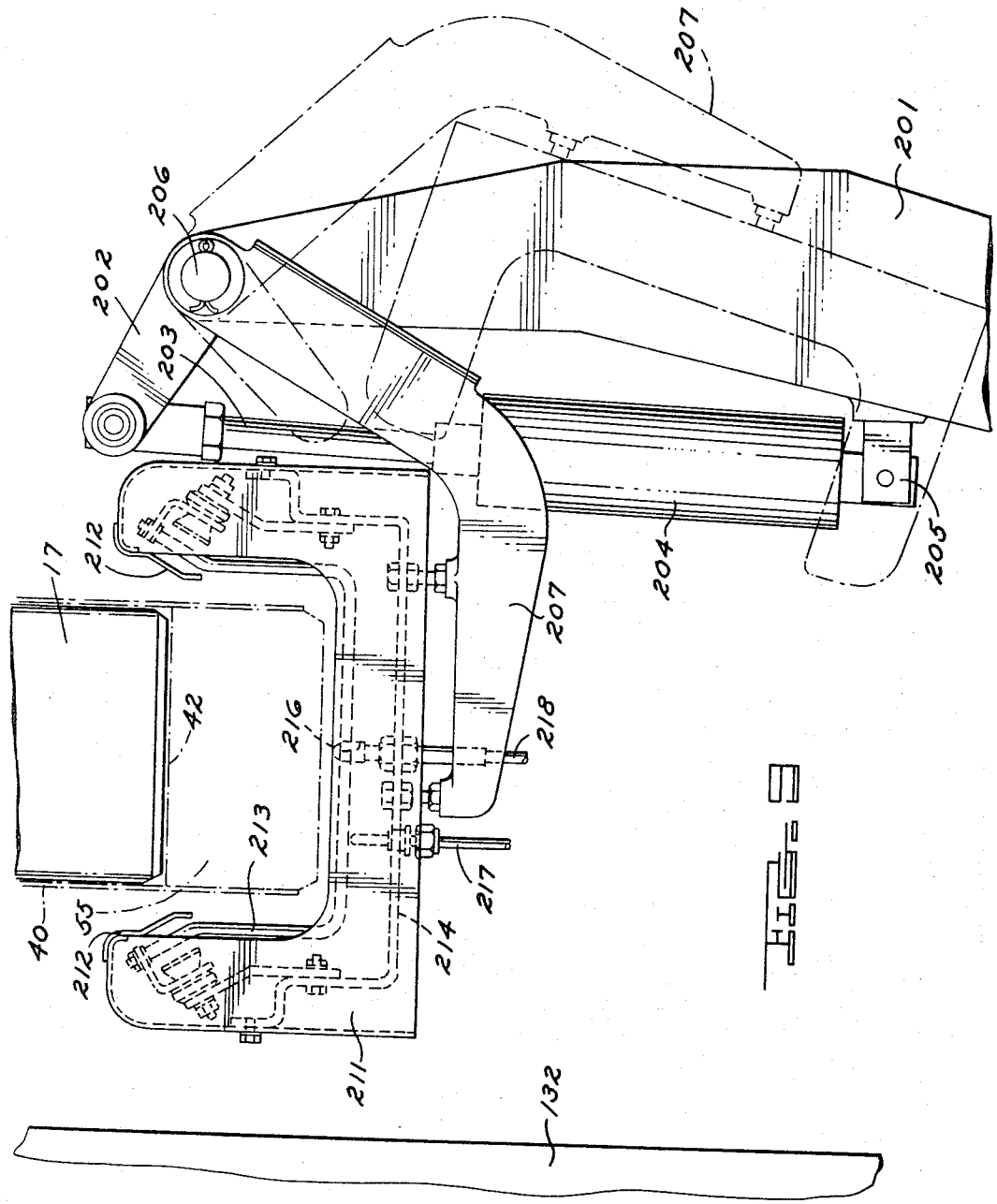

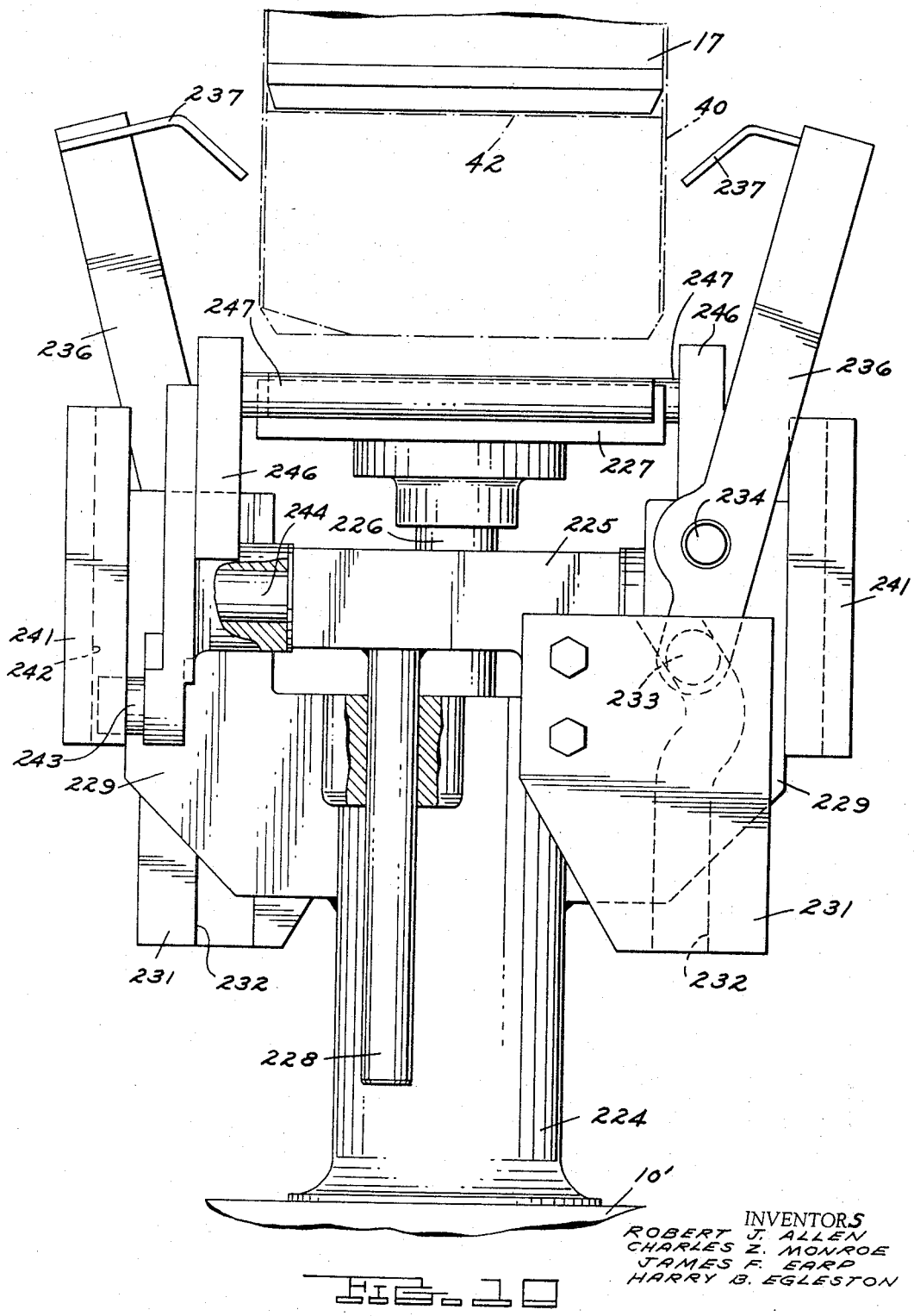

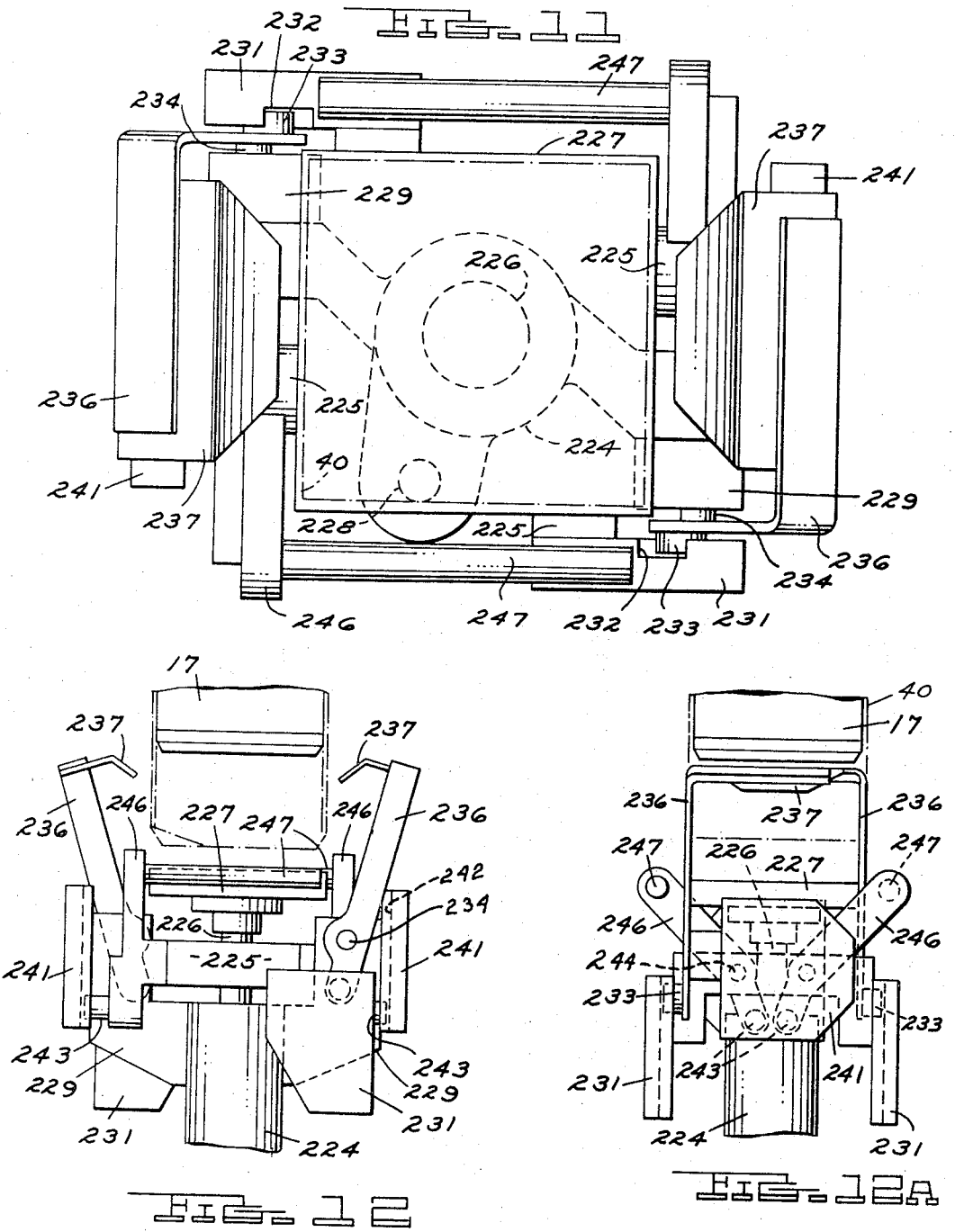

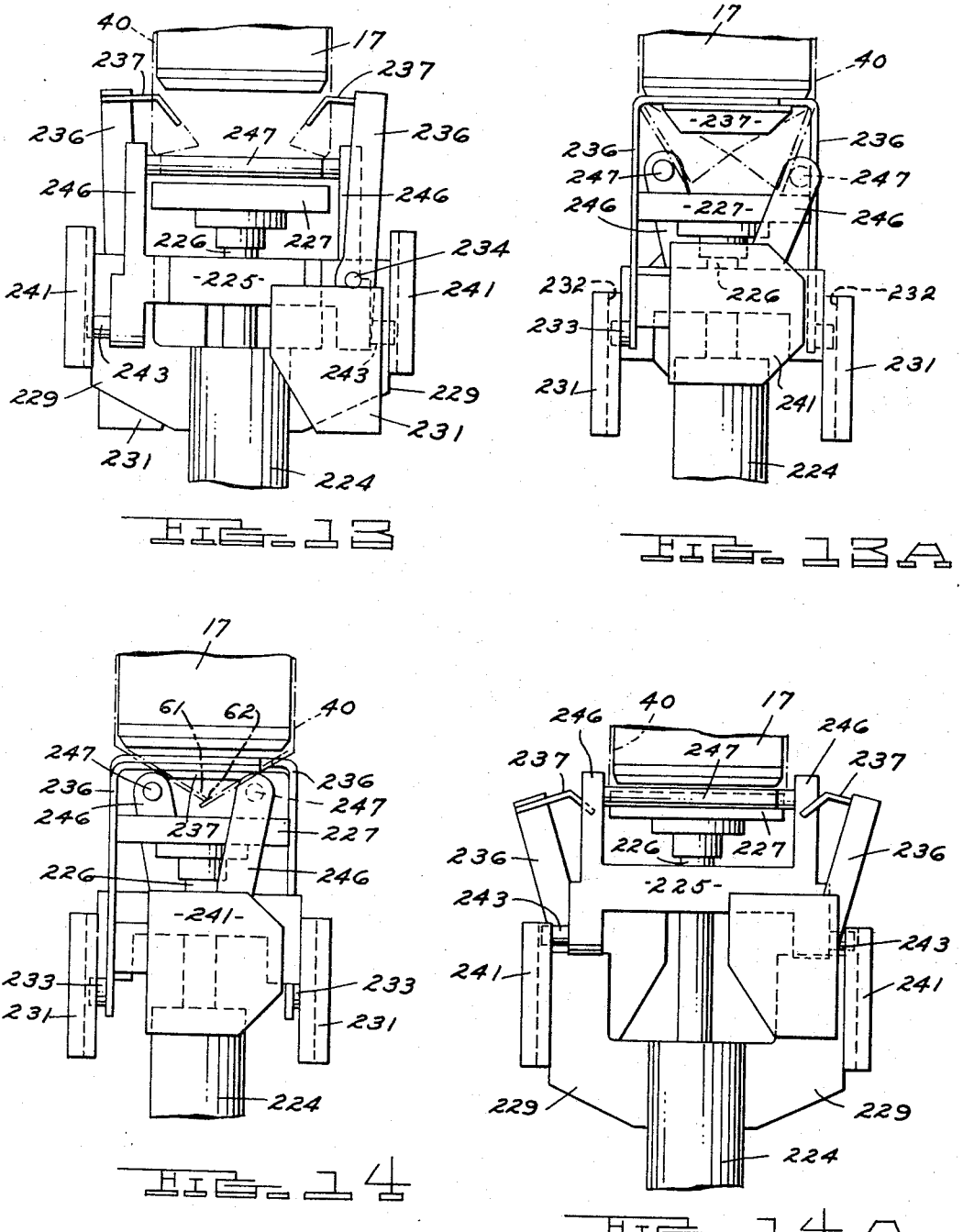

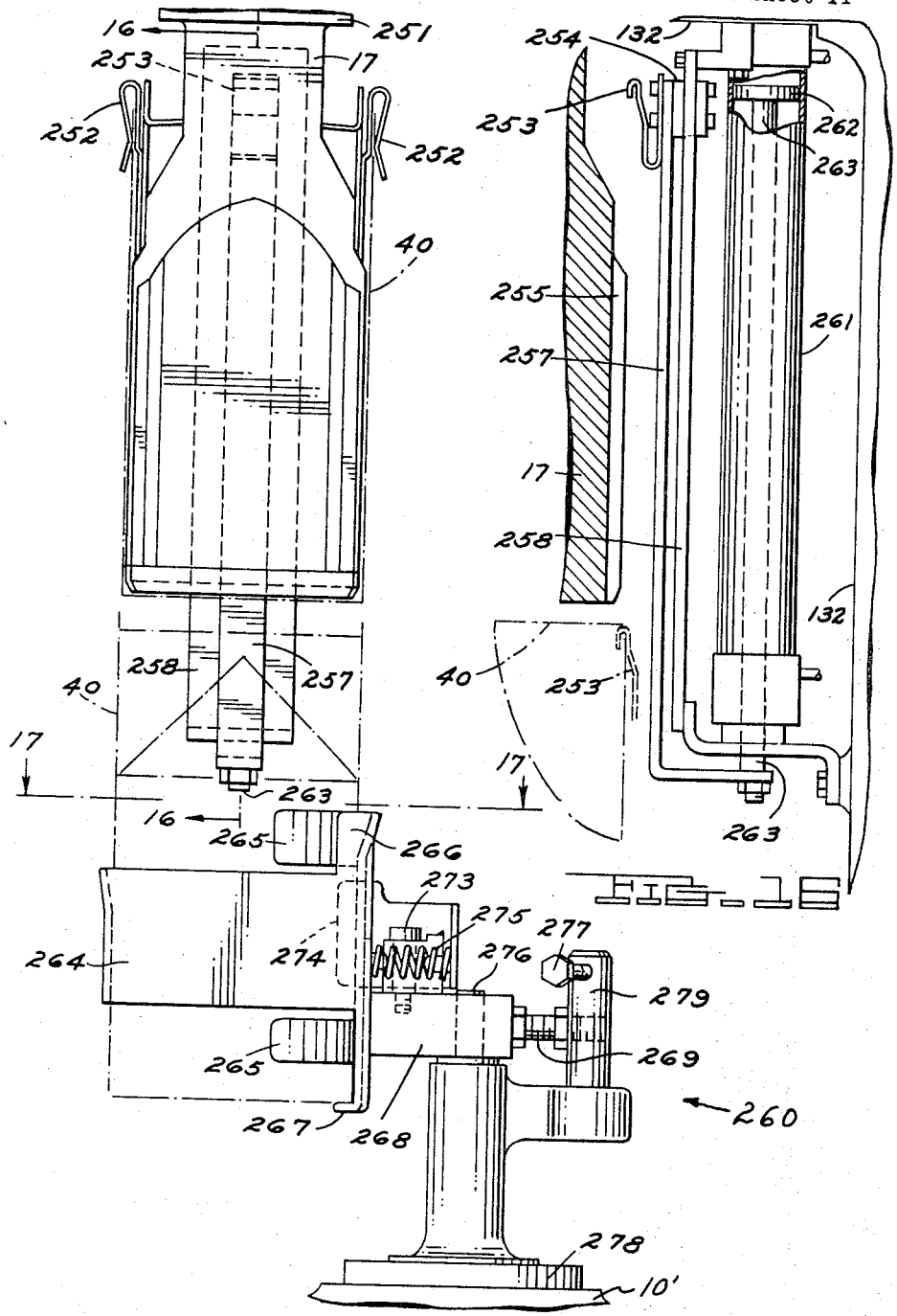

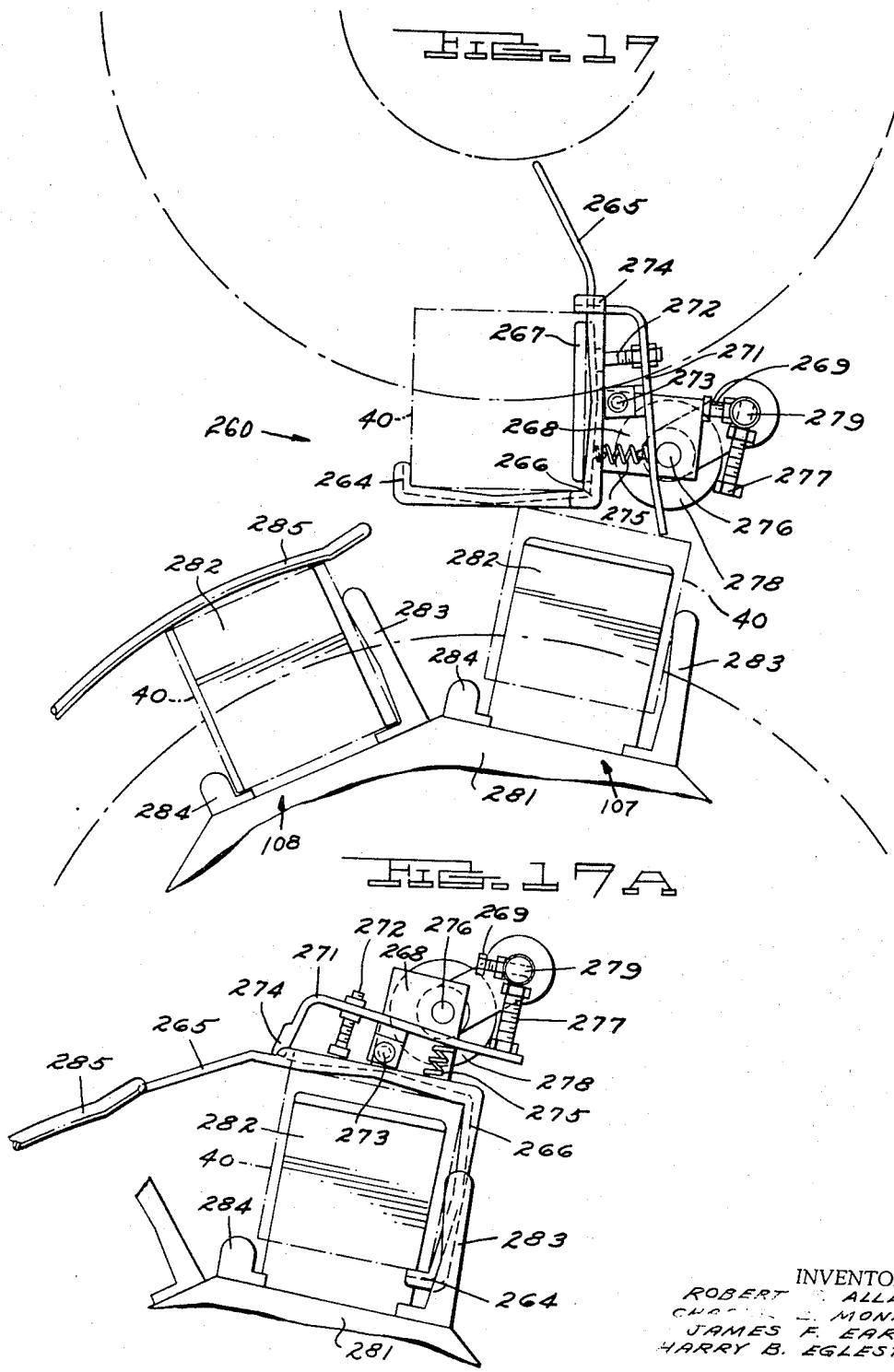

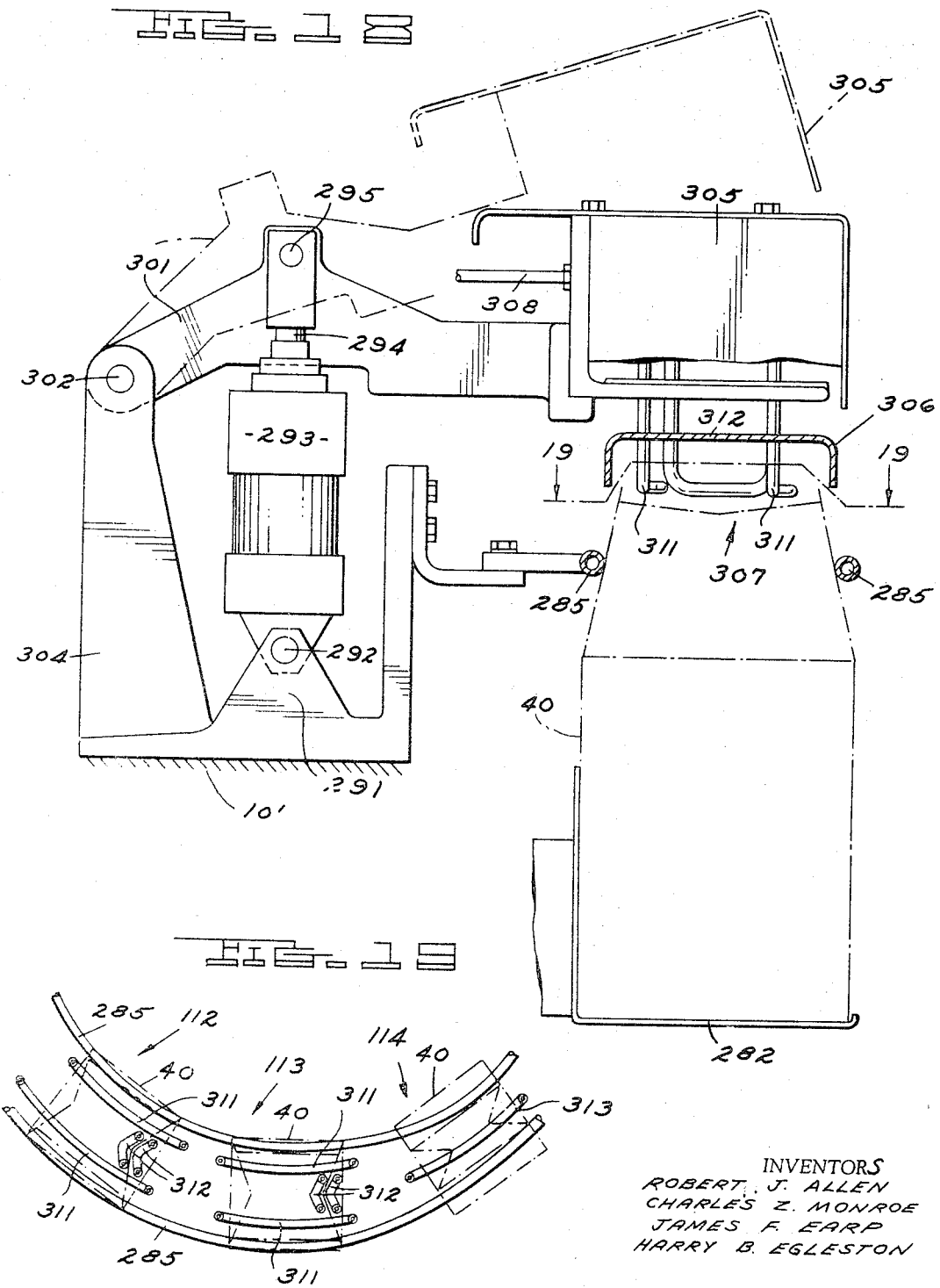

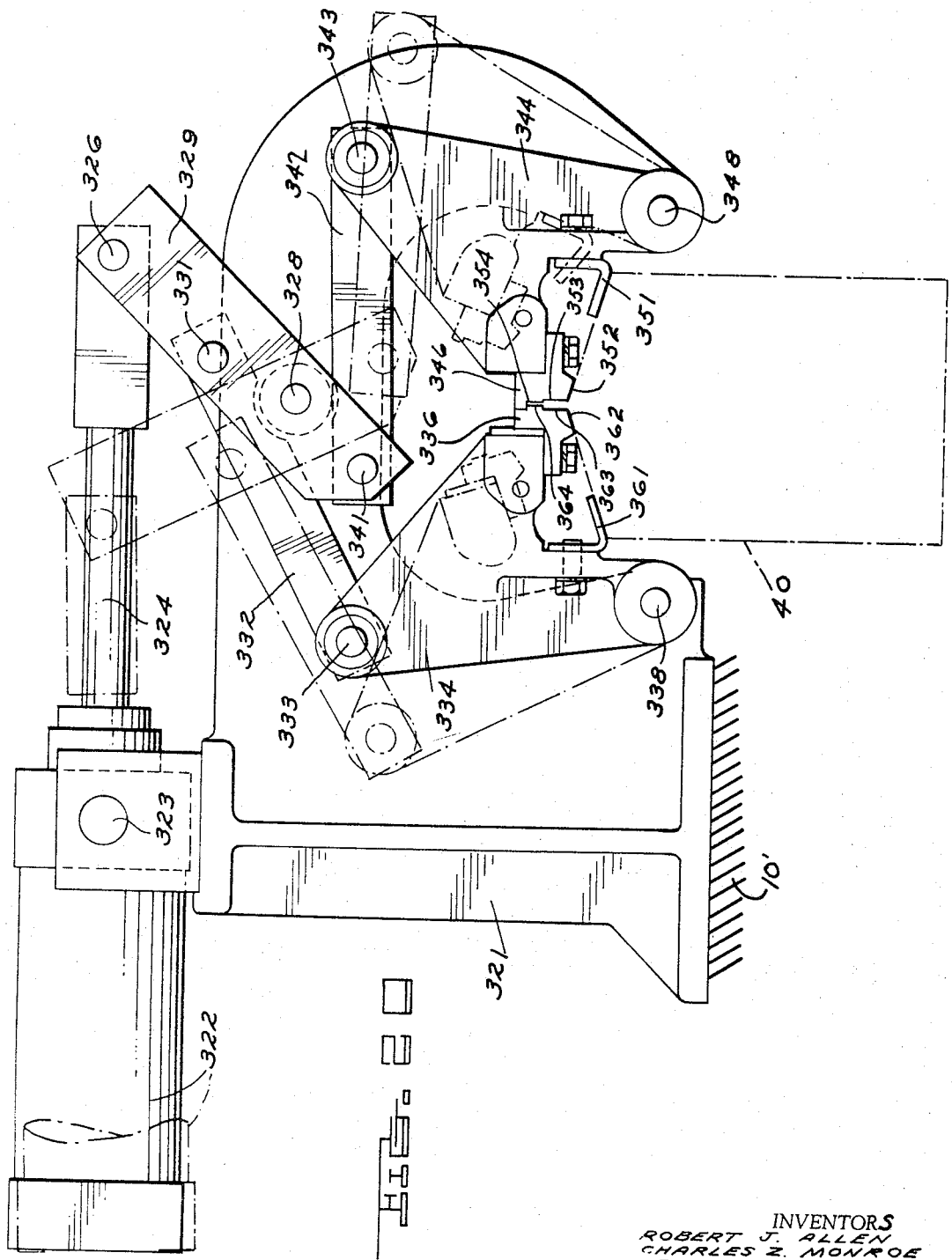

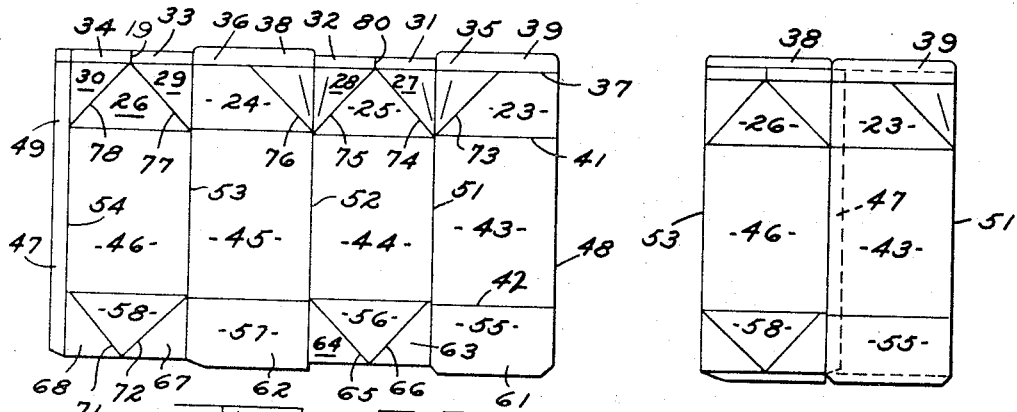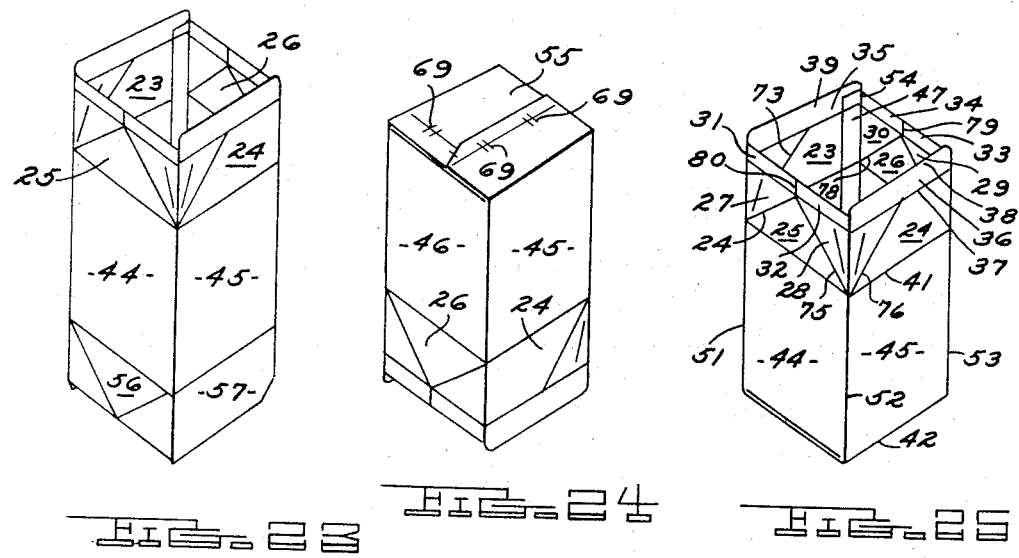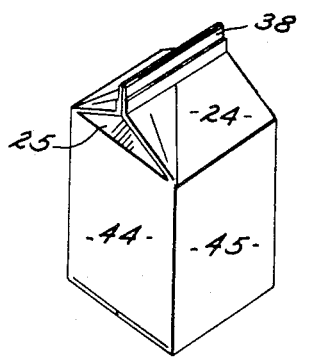

United States Patent Office 3,347,017
Patented Oct. 17, 1967

3,347,017
MACHINE FOR FABRICATING CONTAINERS
Robert J. Allen, Farmington, Charles Z. Monroe, Detroit, James F. Earp, Orchard Lake, and Harry B. Egleston, Livonia, Mich., assignors to Ex-Cell-O Corporation, Detroit, Mich
Original application Nov. 1, 1962, Ser. No. 234,709, now Patent No. 3,212,413, dated Oct. 19, 1965. Divided and this application June 4, 1965, Ser. No. 474,533
4 Claims. (Cl. 53—379)

ABSTRACT OF THE DISCLOSURE

A container fabricating machine for receiving filled thermoplastic coated containers on a conveyor and intermittently moving the containers to a top heater and top sealing apparatus wherein the surfaces of the top closure which form the seal are heated to a bonding temperature and the closure flaps subsequently are moved together and held under pressure until the contacting layers are bonded together.

---

This application is a division of application Ser. No. 234,709 filed Nov. 1, 1962, and now U.S. Patent No. 3,212,413.

The present invention relates in general to a gable top infold bottom coated paperboard carton filling machine. More particularly the invention is concerned with an improved machine for bottom forming, filling, closing and sealing to top of polyethylene coated paperboard containers or the like. The machine finds particular, but not exclusive utility in producing from flat collapsed blanks, finished and filled cartons of the type shown in U.S. patent application No. 707,259 filed Jan. 6, 1958, No. 184,230 filed Apr. 2, 1962, and No. 226,837 filed Sept. 28, 1962, now U.S. Patent Nos. 3,120,333; 3,120,335; 3,185,375; and 3,270,940 which are assigned to the assignee of the subject application.

At the present time there are on the market machines to package plastic coated paperboard containers which are large and expensive due to their high rate of production. There is, however, a need in the market for a small and less expensive machine. Therefore, it is one of the objects of the present invention to supply a very precise and accurate forming, filling and sealing machine which is inexpensive in cost and completely operatable by one operator.

It is an object of this invention to so design the machine that a man may put in flat collapsed blanks and remove finished blanks from the same position.

Another object of this invention is to simplify the mechanical operations and thus keep the cost of the machine as low as possible. One feature providing for this is to maintain the carton always in the upright position; therefore, eliminating any need for manual or automatic equipment to turn the container over.

Another object of the present invention is to so close the bottom closure of the coated paperboard container that the utilization of the bottom heating will be to permit the heat to rise, activating the bottom closure panels.

A further object is to have the minimum mandrel stations to perform functions upon the bottom closure.

It is also another object of the present invention to provide a machine which will fold, tuck and bond the bottom at one station without requiring a pre-break operation prior to the closing.

Another object of the present invention is to utilize the natural spring characteristics of the flat collapsed blank when opening it to place it on the mandrel, and also, to utilize the same natural spring characteristics of the paperboard when transferring the carton from the bottom forming unit to the top filling and closing operation.

A still further object of the present invention includes provision of a structure capable of accomplishing the above objectives with a minimum of material cost and fabricating and at the same time being composed of simple and ruggedly constructed elements which are very reliable in operation.

Other objects and advantages of the invention will be apparent from the following detailed description and claims in connection with the accompanying drawings which form part of the instant specification and which are to be read in conjunction therewith and in which like reference numerals are used to indicate like parts in various use.

FIG. 3 is a plan view of the loader mechanism and its relationship to the bottom closing mandrel assembly;

FIG. 4 is a front elevational view of portion of the loader mechanism taken along line 4—4 in FIG. 3;

FIG. 5 is a front elevational view of the loader mechanism showing the container being moved on to the mandrel taken along line 5—5 of FIG. 6;

FIG. 6 is a top plan view showing the steps for positioning a container below a mandrel;

FIG. 9 is an end elevational view of the heater unit and its associated parts;

FIG. 10 is an end elevational view of the bottom folding, tucking and bonding unit;

FIG. 11 is a top plan view showing the bottom folding, tucking and bonding unit;

FIGS. 12, 12a, 13, 13a, 14 and 14a represent sequence of events for the folding, tucking and bonding unit showing how it acts upon the bottom closure panel to make the container bottom;

FIG. 15 is a front elevational view of the mandrel transfer station and its associated parts;

FIG. 16 is a side elevational view partly in section of the mandrel transfer station taken along line 16—16 of FIG. 15;

FIG. 17 is a top plan view showing the transfer mechanism of the present invention and taken along line 17—17 of FIG. 15;

FIG. 17a is a partial view of the transfer mechanism shown in FIG. 17;

FIG. 18 is an end elevational view of the top heating system and its associated parts;

FIG. 19 is a top plan view partly in schematic showing the top heater elements;

FIG 20 is an end elevational view of the top bonding station;

FIG. 21 is a layout view of a blank from which the cartons are erected showing the inside surface thereof;

FIG. 22 is a flat side seam blank made from the blank shown in FIG. 21 and showing the outside surface thereof;

FIG. 23 is a perspective view of the carton showing it in tubular form as it appears when mounted on a mandrel;

FIG. 24 is a perspective view of the carton end closure in tubular form as its appears after bottom forming; the container is reversed showing its bottom appearance;

FIG. 25 is a perspective view showing the container as it appears when it is stripped from the bottom closing mandrel assembly on to the transfer mechanism; and FIG. 26 is a perspective view of the carton after it has been formed, filled, closed and sealed as discharged from the machines as a completed container.

Figure 1:
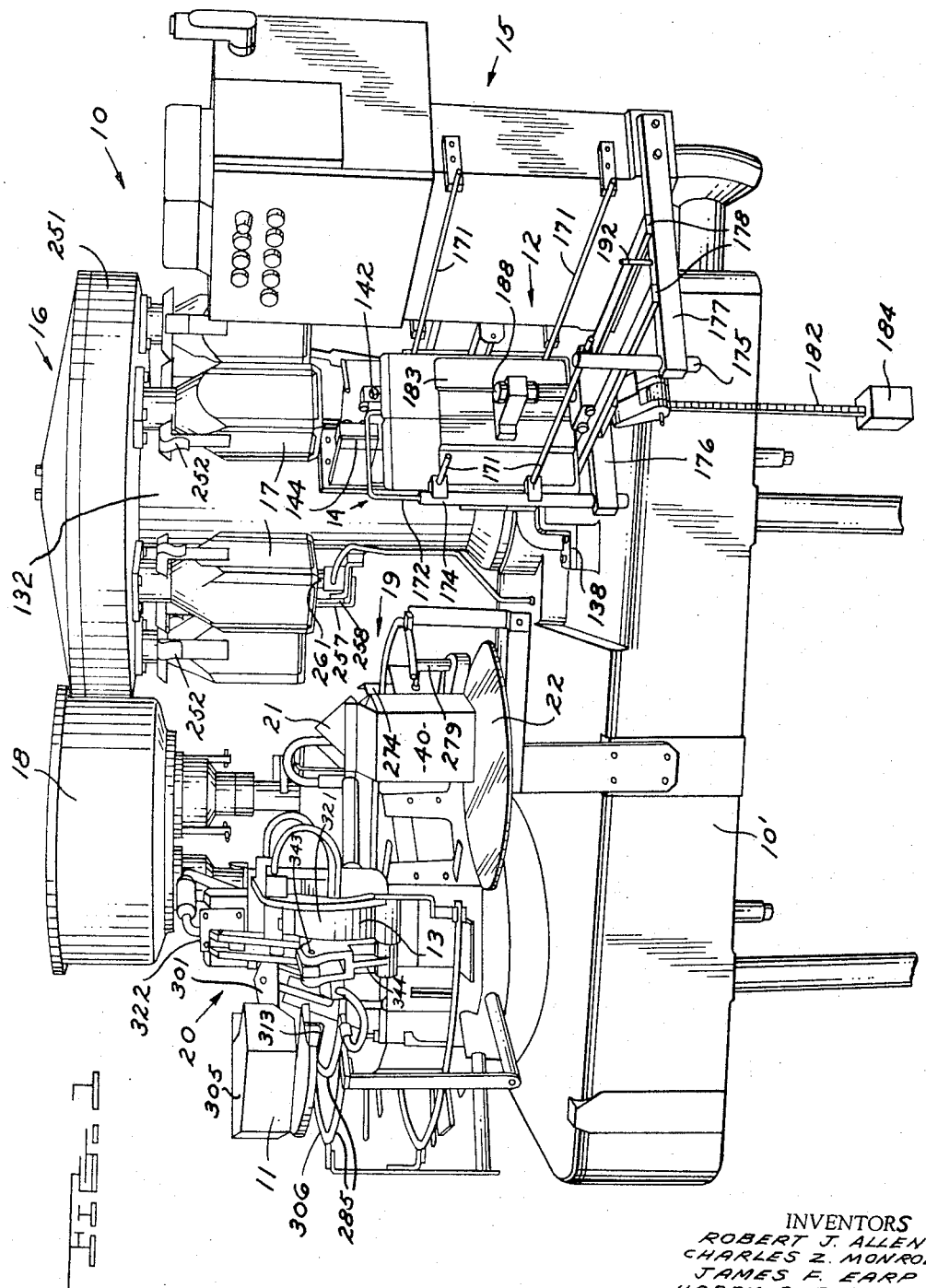
FIG. 1 is a perspective view illustrating a machine embodying the present invention.

While a certain illustrative packaging machine will be described, it should be understood that there is no intention to limit the invention to the specific form disclosed, on the contrary, the intention is to cover all modifications, alternative constructions, equivalents and uses falling within the spirit and scope of the invention as expressed in the appended claims. Before undertaking a detailed description of the present invention, it may be helpful at this point to consider the features of the container which is being formed, filled and closed. In a description of this container, it will be assumed that the paperboard has a polyethylene coating thereon, although again it should be understood that other thermoplastic coatings may find equal utility in application. For a more complete description of the container, reference should be made to the above mentioned copending applications, the disclosures of which are incorporated by reference herein.

Container description

Referring to FIG. 21, the container 40 is in flat blank form with the pattern of appropriate score lines and having the inside surface of the blank showing. The container is separated into three groups by score lines 41 and 42. The material above score line 41 is the top closure, the material between score lines 41 and 42 is the body group and the material below score line 42 is the body closure group. The body group comprises four panels, 43 through 46 and side seam flap 47. The flat blank is defined on the sides by edges 48 and 49, with panels 43–46 being separated by score lines 51 and 54. The top closure comprises roof panels 23 and 24 and end panels 25 and 26. End panel 25 is connected to roof panels 23 and 24 by fold-back panels 27 and 28 respectively. End panel 26 is connected to roof panel 24 and side seam flap 47 by fold-back panels 29 and 30 respectively. Score line 37 defines the top extention of panels 23–26. Attached to roof panels 23 and 24 along score line 37 are outer rib panels 35 and 36 having sealing flaps 39 and 38 at their upper ends respectively. Attached to end panel 25 by fold-back panels 27 and 28 are inner rib panels 31 and 32, respectively, along score line 37. Attached to end panel 26 by fold-back panels 29 and 30 are inner rib panels 33 and 34 respectively, along score line 37.

The bottom closure group is made up of panels 55 through 58. The bottom closure panel 55 has an extended tuck-in flap 61, and bottom closure panel 57 has an extended tuck-out flap 62. The bottom closure panel 56 is flanked by triangular fold-back panels 63 and 64 and connected thereto by score lines 66 and 65 respectively. The bottom closure panel 58 is flanked by triangular fold-back panels 67 and 68 connected thereto by score lines 72 and 71 respectively.

To form a flat side seamed blank as presented to the packaging machine, the panel 46 and side seam flap 47 will be folded about score line 53 until their inside surfaces meet the inside surfaces of panels 45 and 47 respectively. The panel 43 will be folded about score line 51 until its inside surface contacts the inside surface of panel 44 and the outside surface of flap 47. The inside surface along edge 48, which will meet the outside surface of side seam flap 47, is heated to activate its coating and outside surface of side seam flap 47 will be heated to activate its coating, so that as the two surfaces meet they are bonded together. Pressure is usually applied to secure the best possible bond. The edge 48 and the score line 54 will appear as one line. The flat blank container 40, shown in FIG. 22, looks like the flat side seamed carton 40, as shown in FIG. 21, after it is side seamed. It is thus ready to be supplied to the packaging machine. When the container 40 is loaded onto the machine mandrel, it takes a tubular shape, as seen in FIG. 23.

To form the container bottom, the panels 55 and 57 are moved toward each other. Also, the panels 56 and 58 are moved toward each other. This causes fold-back panel 67 to rotate about score line 53 so that the inside surfaces of panels 68 and 57 are coming together. At the same time, panel 67 is rotating about score line 72, thus the outside surfaces of panel 67 and 58 come together. Fold-back panels 63, 64 and 68 make the same movements as panel 67 with panels 55–56, 56–57 and 55–58 respectively. Bottom closure panel 55 moves toward bottom closure panel 57, just enough faster than panel 57 moves toward 55 so that the tuck-in flap 61 is positioned between the fold-back panels 64–67 and 57–62.

Embossing marks 69 are impressed upon formed container bottom at critical locations to prevent any possibility of liquid leakage through the formed bottom of the container 40. After the bottom closure is completely formed, it appears as shown in FIG. 24. When the container 40 is transferred from the bottom closing mandrel assembly to the top closing assembly, it will appear as viewed in FIG. 25.

To form the container top, the end panels 25 and 26 rotate about score line 41 and move toward each other. This causes roof panels 23 and 24 to move towards each other, rotating about score line 41. The fold-back panel 28 rotates about score line 52 causing its inside surface to move toward the inside surface of roof panel 24. At the same time panel 28 rotates about score line 75 causing its outside surface to move toward the end panel 25. Panel 28 also has a slight rotation about score line 37 with respect to inner rib panel 32, permitting panel 32 to remain in a vertical up and down position. Fold-back panels 27, 29 and 30 make the same movements as panel 28 with panels 23–25–31, 24–26–33 and 23–26–34, respectively. Score lines 79 and 80 meet at the middle of the container 40. Sealing flaps 39 and 38 will meet at the top of the container running from the middle of panel 44 to the middle panel 46.

General Description

The packaging machine generally indicated as 10 in FIG. 1, is adapted to receive a supply 14 of side seam blanks, similar to the one shown in FIG. 22. A carton blank 40 is removed from the supply 14 by a loader mechanism 12 and positioned on a mandrel 17 of the bottom closing mandrel assembly 16. This mandrel assembly moves the mandrels from left to right as viewed in FIG. 1 and indexes the mounted container 40 to various stations at which time the end closure, in the present case the bottom, is folded, tucked and bonded. When the mandrel 17 reaches the transfer station 19, the bottom formed container 40 is stripped off the mandrel and is transferred to the top closing assembly 20 where the top is pre-broken by top pre-breaker 21. This top closing assembly 20 rotates in the same direction as the mandrel assembly 16. After top pre-breaking is completed the top closing assembly 20 indexes the bottom formed container 40 to the filler unit 18, where the container is filled. At that time the container passes under the top heating unit 11 where the inner and outer rib panels are appropriately heated. The container then passes to the top closing unit 13 where the top is sealed. The container 40 is then discharged from the machine onto the disc discharge table 22 and is ready for delivery to the customer in its completed form as viewed in FIGS. 1 and 26.

Figure 2:
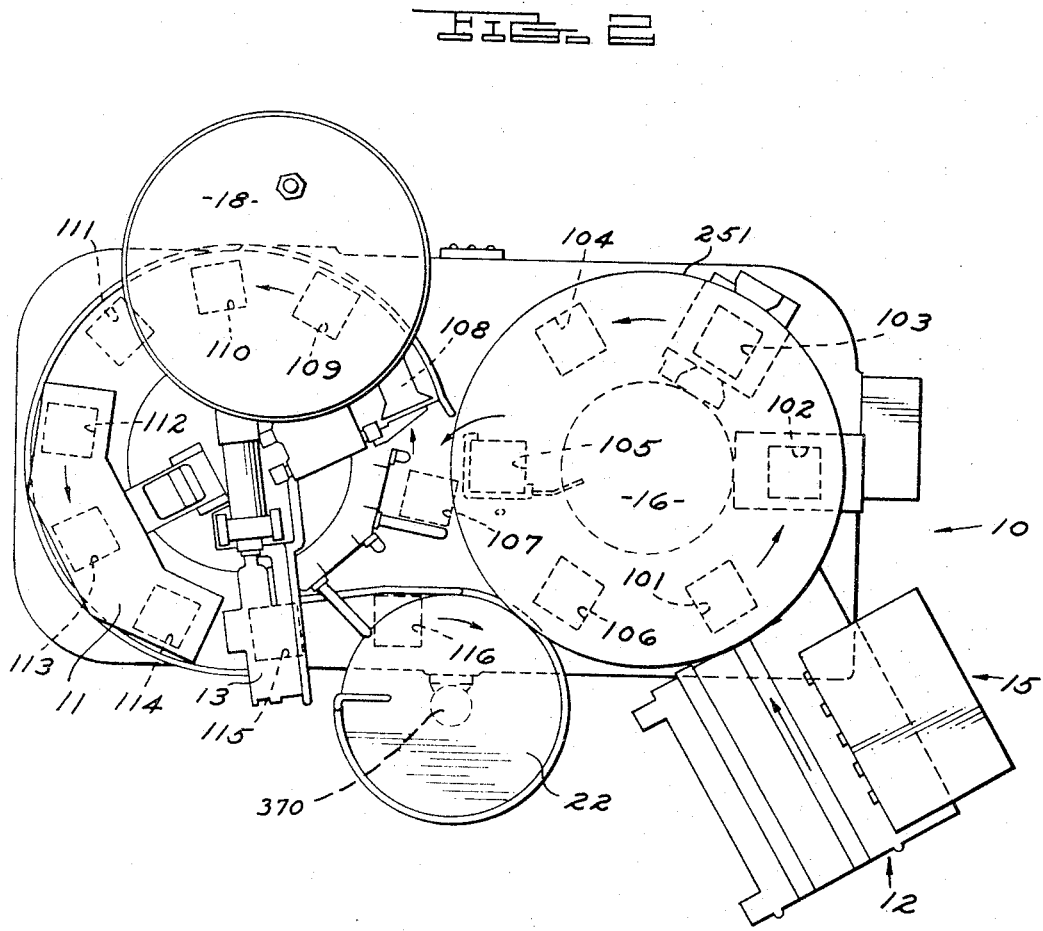
FIG. 2 is a schematic plan view showing the machine and the position of its relative part.

As viewed in FIGS. 1 and 2, the container blank 40 is taken from the side seamed blank supply 14 by loader mechanism 12 and transferred to the loading station 101. Mandrel assembly 16 then indexes mandrel 17 from loading station 101 to the bottom heat station 102. On the second index the container 40 is rotated to the botttom folding, tucking and bonding station 103. The third index moves the container 40 to dwell station 104. The fourth index moves the container 40 to mandrel ejection station 105 where the container is stripped from the mandrel down to a transfer unit 10. The container is then transferred to the rotary indexing top closing assembly 20 at receiving station 107. The mandrel which has just had its container stripped from it is then indexed a fifth time to dwell station 106. During the fifth index, the container transferred to station 107 is indexed to top pre-breaker station 108. On the sixth index the mandrel 17 on the mandrel assembly 16 will be at the load station 101 to receive another container 40 and start the next cycle. Also, on the sixth index the container 40 at station 108 of the top closing assembly 20, will index to station 109 where the container is partially filled with liquid. The container is then given a seventh index to station 110 where the liquid filling operation is completed by filler unit 18. Whether to use both fill stations depends upon the volume of liquid to be filled.

The top closing assembly 20 then rotates to dwell station 111. The unit 20 continues to index rotating through stations 112, 113 and 114 which are heat stations where the top panels are heated so that the container can be sealed together when the container 40 reaches sealing station 115. As the assembly 20 continues to rotate, at discharge station 116 the container will be discharged onto disc discharge table 22. The unit will then rotate to the receiving position 107 to receive another container from the bottom closing mandrel assembly 16.

Figure 7:
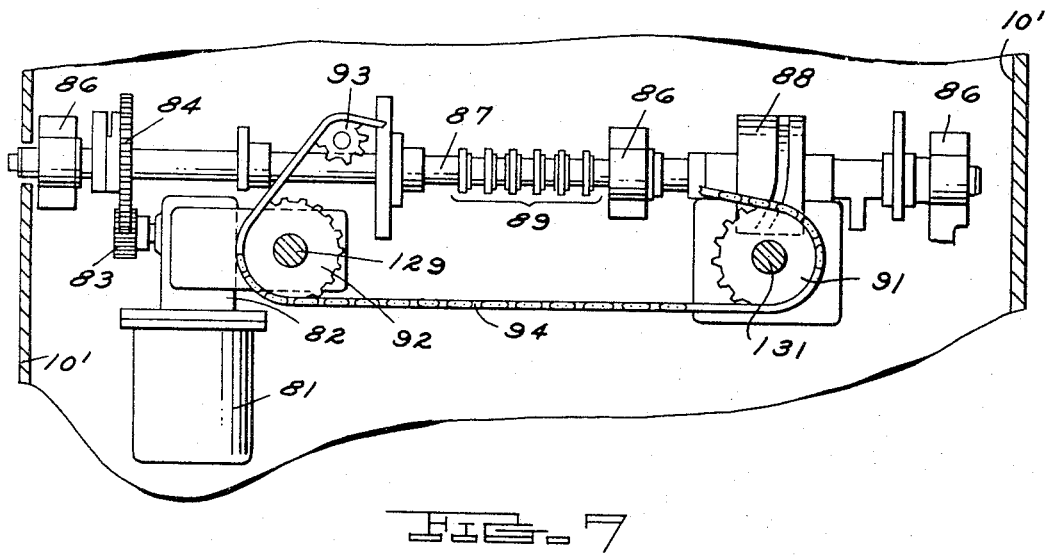
FIG. 7 is a top plan view showing power systems of the present invention.

Referring generally to FIG. 7, the power system is shown oriented similar to the orientation of the packaging machine as shown in FIG. 2. The motor 81 is mounted to the machine base 10' and acts through gear reducer 82. The gear reducer drives pinion 83 which rotates gear 84. The gear 84 is secured to and part of main power shaft 87. The shaft 87 is rotatably mounted to the machine base 10' through mount supports 86. Barrel drive cam 88 is secured to and part of main power shaft 87 and it has a cam track that acts on a cam follower attached to mandrel assembly gear 91. One rotation of main power shaft 87 will give gear 91 one sixth (⅙) index. The 91 is secured to and part of mandrel assembly shaft 131 and for every index of gear 91, the mandrels 17 of the bottom closing mandrel assembly 16 will be moved to a new index station. For example, from load station 101 to bottom heat station 102.

The mandrel assembly gear 91 is connected to top closing assembly gear 92 by drive chain 94. The gear ratio is such that one index of gear 91 will index gear 92 one tenth (1/10) of a revolution. The gear 92 is secured to and part of top closing assembly shaft 129 and for every index of gear 92, the outer housing 281 of the top closing assembly 20 will be moved to a new index station. For example, from receiving station 107 to pre-break station 108. Rotatable idler gear 93, mounted adjustable to machine base 10', is connected to gears 91 and 92 by drive chain 94 to take up slack in chain 94. There are many actuation means secured to shaft 87 such as solenoid switch cam controllers 89 to actuate associated cylinders, etc. of the packaging machine.

The individual features of the machine will now be explained and described in detail.

*Load Mechanism*

Referring generally to FIGURES 1, 3, 4, 5 and 6 the loader will be explained in detail. Mandrel assembly shaft 131 rotates the bottom closing mandrel assembly 16 and is surrounded by stationary mandrel support housing 132. A side seamed container blank supply 14 will be placed upon track members 178. The blanks are supported so that they may be fed onto the mandrel assembly 16. The blanks are forced towards the mandrel assembly support housing 132 by tension plate member 183. The tension plate member 183 is swivelably connected to support bracket 187. The bracket 187 is secured to shaft member 188 which is in turn connected to plate support 186. The plate support 186 is rollably mounted to the track members 178 by plate support rollers 189. A chain 182 is connected to the tension plate member 183 below track members 178. The chain 182 rolls around chain roller 181 and has a weight 184 which tends to move the unit forward towards the mandrel support housing 132. When no blanks are on the unit or a new supply is to be put on, the tension plate member 183 and its associated part may be pulled to the rear of the loader mechanism, so lock latch 191 is in position to be pushed into contact with lock pin 192. This prevents tension plate member 183 and its associated parts from moving forward. Therefore, a new supply of blanks 14 may be placed ahead of it and when the latch 191 is released from the lock pin 192 the tension plate will be moved forward to continually urge the carton blank supply 14 forward.

The track members 178 are supported by support means 176 and 177, which are secured to the operator control box and support member 15. The lock pin 192 is secured to support beam 177. Support rods 174 and 175 are secured to the ends of support beams 176 and 177, respectively. Support rod 174 has retainer arm 172 secured at its upper end and just below its upper end it has a guide rod support 179 which supports a guide rod 171. Near its lower portion and above support beam 176 is located another guide rod support 179 which supports another guide rod 171. Support rod 175 has a guide support 179 secured to it above support beam 177 approximately the same height the lower guide rod support 179 is secured to support 174. They support the same guide rod 171.

Operator control box and support member 15 has two sets of guide rod supports 179 secured to it supporting an upper and lower guide rod 171. The bottom set is approximately the same height above support beams 176 and 177 as the lower guide rod 171 which is secured to support rod 174 and 175. The upper guide rod 171 is approximately the same height as the upper guide rod 171 which is secured to support rod 174.

At the end of the guide rods 172 adjacent the mandrel support housing 132 are retainer buttons which are eccentrically secured in the ends of the rod so that they can be rotated to permit as much contact as is needed to retain the flat cartons in the side seam container blank supply 14. When the supply of blanks 14 are placed upon the track members 178 the container will be so oriented that the top panels are up and the bottom panels are down. Score line 51 will be held by the guide rod 171 at the end of support beams 176 and 177. Score line 53 will be acting on the guide rod 171 held by the guide rod supports 179 which are secured to the operator control box support member 15. Side panels 43 and 46 will be towards the mandrel support housing 132 and the side panels 44 and 45 will be towards and acted upon by the tension plate member 183. FIG. 3 shows the system as it would appear when the suction nozzle cups 156 are forward to remove one container from the supply 14 (no supply being shown).

Nozzle cylinder 159 controls the movements of the system. The cylinder 159 has nozzle rod 158 which is secured to the nozzle support arm 152. Secured to the nozzle support arm 152 are nozzle guide rods 155 which permit the cylinder 159 to reciprocate nozzle rod 158 while maintaining proper alignment of the nozzle support arm and its associated elements. At the end of the nozzle support arm 152 is nozzle support housing 151 which supports the suction nozzles 156. Carton bowing plate 153 is movably mounted to suction nozzle 156. Plate 153 is forced towards the cup portion of the suction nozzle cups by springs 154. It has attached to it bowing plate stop pin 145. In FIG. 3 the pin is shown in contact with support beam 176, thus compressing spring 154 and causing the carton bowing plate 153 to move away from the cup end of the suction nozzle cup. The nozzle cups are attached to vacuum line 157 through ducts inside nozzle support arm 152 and nozzle support housing 151. In the position shown in FIG. 3 they would contact the front carton on panel 44. At this position nozzle rod 158 in its retracted position, will start to be extended which will cause the first container to be moved with the suction cups 156. As the cups move away from the supply 14 the first container will move with it and the spring 154 will move the bowing plate 153 towards the end of the nozzle cup 156. Bowing panel 44, helping it to be removed from the supply stack.

As viewed in FIG. 4 the retainer arm 172 is acting on sealing flap 38. This will start side panel 43 rotating about the score line 51 and moving away from side panel 44.

As viewed in FIG. 6 it is shown that the container will be started into a diamond shape. As the rod 58 continues to move toward support housing 132, cam follower 148 will be moving along cam track 147, in the cam member 149. When it arrives at the end of the cam track 147 it will cause rotating arm 139 to rotate about shaft 140. The corner guide 141 which is part of the end of rotating arm 139 will contact the container blank 40 at score line 53. As it continues to rotate it will turn the carton diamond shape into a square cross section. The container 40 will be in a general shape as shown in FIG. 23.

At the end of the stroke of rod 158, score line 51 will be acted upon by the guide rollers 142 and 143. It should be noted that at the present time the container has a tendency to want to lie flat, so as to have score lines 54 and 52 in contact with each other. The container is so loaded in the loader mechanism that the guide rollers 142 and 143 will act on score line 51 and that the corner guide 141 will act on score line 53. Therefore they are working against the natural tendencies of the container blank to remain flat. This permits the accurate positioning of the score lines 54 and 52 because they want to come towards each other. With the proper control of score lines 51 and 53 they can be positioned without actual contact with them. It should be noted from FIG. 4 that guide rollers 144 are not in contact with the container blank at the present time permitting the container blank 40 to be positioned under mandrel 17.

The rotating arm support 138 is stationary and is attached to the machine base 10'. It has a bore which shaft 140 passes through and is permitted to rotate in. On the upper end of shaft 140 the rotating arm 139 is positioned and rotates with the shaft due to interaction with the detent 133. The rotating arm 139 is forced against the detent by spring 136 which is compressed between spring retainer 137 and the arm 139. The cam member 149 is secured to the lower end of shaft 140 and it will rotate with the shaft as it rotates. If the corner guide 141 is not free to rotate, the resistance will be passed through rotating arm 139 and the detent will force the arm 139 to compress the spring and permit the shaft 140 to continue to rotate without damage to the rotating arm and its attached parts.

When a container 40 is in position under mandrel 17, the load cylinder 196, secured to load pusher plate 197 attached to the machine base 10', is activated to move loader rod 194 up. Load plate 193 is held in alignment by loader guide rod 195 and the loader rod 194. The load pusher plate 193 will continue up and act on the bottom panels of side panels 44 and 46, thus moving the container 40 onto mandrel 17. To guide the container 40 at score 53 as it moves upward, are guide rollers 144. When the loader rod 194 has reached its final up position, the container 40 will be mounted on the mandrel 17 and will be held there by carton rod clips 252, not shown here, which will be explained and shown later in the specification.

*Mandrel assembly*

Generally referring to FIGS. 1 and 2, it is shown that the cartons are transferred from the loader mechanism 12 to the rotating bottom closing mandrel assembly 16 at load station 101. The carton blank 40 will be positioned on mandrel 17 with the top panels up, the bottom panels down, and score line 42 will be approximately at the bottom of the mandrel 17. After the container is positioned on the mandrel 17, the mandrel is indexed to bottom heat station 102.

Figure 8:
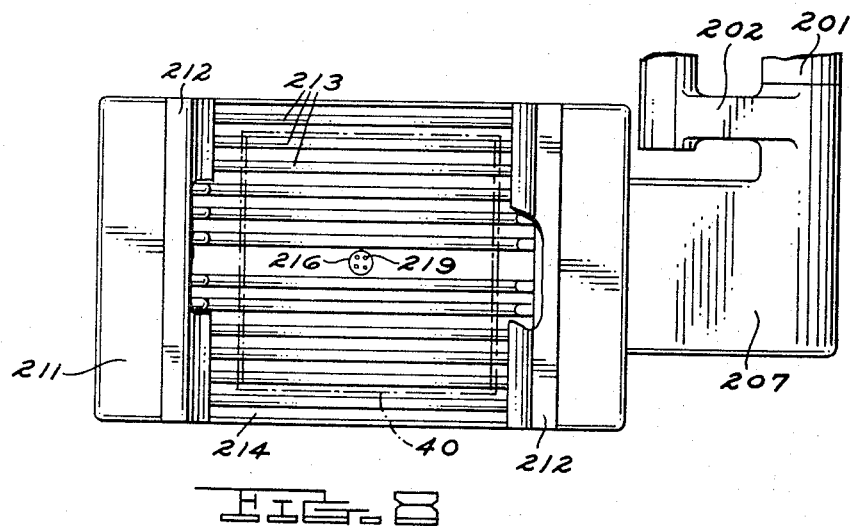
FIG. 8 is a top plan view of the bottom heater unit.

Referring generally to FIGS. 8 and 9, bottom heater support member 201 is secured to machine base 10'. The bottom heater support member 201 has support pin 206 rotatably secured at its upper end. Positioned on part of support pin 206 is bottom heater support arm 207. At one end of the bottom support arm 207 is connecting arm 202. Connecting arm 202 is rotatably attached to bottom heater rod 203. The rod 203 is activated by bottom heater cylinder 204. Heater cylinder 204 is rotatably attached to the bottom heater support member 201 by cylinder support 205. The support arm 207 has the bottom heater housing 211 attached to it.

As viewed in FIG. 9, we have an electrical line 217 and air line 218 coming into the housing 211. Electrical line 217 is connected to bottom heater elements 213. Bottom heater support plate 214 is housed in and secured to the housing 211. Plate 214 has air line 218 secured to it supporting the air nozzle 216. As viewed in FIG. 8, the air nozzle 216 has four air nozzle outlets 219. The nozzle outlet 219 is directed to the four corners of the bottom closure of container 40. As the container 40 is positioned over the heater element, the air released from the air nozzle outlets 219 will force warm air into the inside corners of container 40 helping to heat up sufficiently to activate the thermoplastic on the bottom panels, putting them in condition for bonding.

Bottom heat shield 212 is mounted on housing 211 and is used to reflect the heat from the top portions of bottom heater elements 213 so that heat will be concentrated on the bottom closure panels 55, 56, 57 and 58. Shield 212 reduces the heat which will be transferred to the container above score line 42. Bottom heater cylinder 204 may be operated manually or automatically. It may be manually activated to remove the heater unit from its operating position, as shown in FIG. 9 by the solid lines, to its retracted position, shown in phantom in FIG. 9. The air cylinder 204 will retract bottom heater rod 203, causing connecting arm 202 to rotate counter-clockwise about support pin 206. The arm 202 is connected to and part of bottom heater support arm 207. The movement of arm 202 will turn support arm 207 in a counter-clockwise direction with it, moving the heater unit and its associated parts to the retracted position. This feature will occur automatically when the machine is stopped, thus preventing a carton blank 40 from being ignited due to overheating while at station 102. The container bottom surfaces will be heated until the thermoplastic surface becomes activated so that bonding may occur at the next index station 103.

The container 40 is then indexed from bottom heat station 102 to folding, tucking and bonding station 103. Generally referring to FIGS. 10 through 14, the function accomplished at the folding, tucking and bonding station 103 will be discussed in detail. Pressure pad support member 224 is secured to the machine base 10'. Shaft 226 is housed in member 224 and is allowed to reciprocate in said member. Pressure pad 227 is secured to one end of shaft 226. Below pad 227 and secured to shaft 226 is support plate 225. Guide shaft 228 is secured to support plate 225 and prevents misalignment of the shaft 226 and its associated part as they reciprocate up and down. Reciprocating cam plate 231 is secured to support plate 235 and reciprocates with it. Cam track 232 is part of reciprocating cam plate 231. Cam follower 233 is attached to one end of breaker arm 236 and moves along cam track 232. Breaker arm 236 is pivotally connected to stationary pivot 234. Breaker shoe 237 is connected to the opposite end of breaker arm 236. There are two sets of breaker arms and breaker shoes. The breaker shoes 237 will act on bottom closure panels 56 and 58 in a manner to be described later in the specification.

Tucker arm 246 is connected to support plate 225 by reciprocating pivot 244. Attached to one end of tucker arm 246 is tucker rod 247. At the opposite end of tucker arm 246 is attached cam follower 243. The cam follower 243 is operated by cam track 242 which is part of stationary cam plate 241. Stationary cam plate 241 is attached to support block 229 which is stationary and secured to the pressure support member 224. We have two sets of tucker rods 247 which act on bottom closure panels 55 and 57. The tucker rod acting on closure panel 55 will move just a little faster than the tucker rod acting on bottom closure panel 57 so that the tuck-in flap 61 on panel 55 will be between the tuck-out flap 62 and the container body. A complete description will be given later in the specification.

As viewed in FIG. 10, the breaker arm 236 on the left will be nearer to the mandrel support housing 132. The right breaker arm 236, in FIG. 10, will be radially displaced from the first breaker arm with respect to housing 132. The tucker rods 247 will be essentially an equal distance from the mandrel support housing 132. The bottom closure panel 57 will be the leading panel of the carton 40 as it rotates with the bottom closing mandrel assembly 16.

Referring to FIGS. 12 through 14, a method of closing the container bottom will be explained in detail. A complete description of the bottom and its features are disclosed in copending application 184,230, filed Apr. 2, 1962. FIGS. 12 and 13 show the bottom folding, tucking and bonding means in its initial position when the mandrel 17 is indexed over pressure pad 227. Tucker rods 247 are below the end of the container permitting the mandrel with the mounted carton blank to be passed over it. Breaker arms 236 and breaker shoes 237 are positioned away from the container line of travel so that the mandrels with the mounting containers can be indexed between them. After the mandrel is in position, the shaft 226 is activated upward by means not shown, such as an air cylinder. As the shaft 226 moves upward, it starts moving pressure pad 227 toward the bottom closure panels.

Just below pressure pad 227, is support sleeve 225, which is secured to shaft 226 and reciprocates with it. Attached to the support plate is reciprocating cam plate 231 which reciprocates with the support plate 225. The cam track 232 acts on cam follower 233 as it reciprocates upward and downward. This causes the breaker arm 236 to rotate in and out from the pressure pad path. As the pressure pad starts upward, the breaker shoes 237 will start contacting triangular bottom closure panels 56 and 58. This will cause breaking of score lines 51, 52, 54, 55 below score line 42, and the breaking of score line 42, along with the breaking of score lines 65, 66, 71 and 72. As breaker shoes 237 continue moving in and toward each other, they are moving the panels 56 and 58 toward each other. At the same time, the support plate 225 is moving the tucker arm 246 and rod 247 upward by moving reciprocating pivot 244 upward. As the shaft 226 continues upward, the cam follower 243 is being acted upon by cam track 242, which is part of stationary cam plate 241, which is secured to support block 229. Cam track 242 will cause the tucker arms to rotate about reciprocating pivot 244 toward each other, so they will start acting on panels 55 and 57.

Referring generally to FIGS. 13 and 13a, we show the breaker shoes 237 acting on bottom closure panels 56 and 58, and tucker rods 247 acting on panel 55 and 57. As shaft 226 with associated parts continues to move upward, the cam track 232 causes the breaker arms 236 to move away from each other and out from mandrel 17. The tucker rods continue toward each other, with the tucker rod 247 acting on bottom closure panel 55 moving a little faster than the tucker rod 247 acting on bottom closure panel 57, so that the tuck-in flap 61 starts acting on the inside of tuck-out flap 62, as viewed in FIG. 14, causing the bottom to be tucked. As the shaft 226 continues upward, the pressure pad 227 will start acting on tuck-out flap 62, thus preventing the bottom closure panels from opening up and becoming untucked. The pressure pads will continue upward, the tucker rods 247 having been cleared from the pressure pad path, as will the breaker shoes 237. The pressure pad 227 will continue upward, putting pressure on the bottom closure panels causing them to be bonded together to form a liquid-tight bottom.

There are embossing marks on shoe 227, which are not shown in the drawing, and they will emboss the formed bottom closure at 69, as shown in FIG. 24. The pressure pad 227 and the mandrel 17 may be water-cooled if required. This prevents the heated thermoplastic surfaces from sticking to them.

The panel 45 will be the leading panel and will leave the pressure pad first, this will cause bottom closure panel 57 to slide along the pressure pad 227 in the lead position, thus preventing the tuck-over flap 62 from catching on any possible obstruction on pressure pad 227. The pressure pad is now indexed to dwell position 104. At this station a second pressure pad could be incorporated if desired. The speed of the machine will help determine whether a second pressure pad is needed because the speed controls the length of time that pressure pad 227 will have to act on the bottom closure panels before the mandrel 17 is indexed to the next position 104. The mandrel will be indexed from dwell station 104 to mandrel ejection station 105.

Referring generally to FIGS. 15, 16, 17 and 17a, we will discuss the ejection means of the bottom closing mandrel assembly 16. Referring to FIG. 15, we have mandrel 17 secured and rotating with mandrel support 251. The manual support is secured to the top end of the mandrel assembly shaft 131 and rotates with it. Mandrel 17 has carton hold clips 252. One clip 252 on the right, as viewed in FIG. 15, is a lead clip and grips roof panel 24 of the carton 40. The trailing clip 252, shown on the left in FIG. 15, grips roof panel 23 of the carton 40. End panel 25 would be on the forward side of the mandrel 17, as viewed in FIG. 15, and is not gripped by a clip. End panel 26 would be on the rearward side of the mandrel 17, and is not gripped by a clip.

As seen in FIG. 2, the panel 26 would be facing the bottom closing mandrel assembly 16, and the end panel 25 would be facing the top closing assembly 20, and the roof panels 23 and 24 would be facing sides of the machine 10.

Shown in FIG. 16 is stripper cylinder 261, which is secured at its upper end to the mandrel assembly support housing 132, and at its lower end to a stripper clip guide support 258, which is also secured to the housing 132. The cylinder 261 comprises piston 262 and a piston rod 263. Piston rod 263 is secured to the piston 262 at its upper end and to stripper clip support 257 at its lower end. The stripper clip 253 is secured to the upper end of stripper clip support 257. The stripper clip support 257 has stripper clip guide 254 secured to its upper end.

The guide 254 is guided by a slot in stripper clip guide support 258. When mandrel 17 comes into position at mandrel ejection station 105, the stripper clip cylinder 261 is activated, causing piston 262 and piston rod 263 to be moved downward. This will cause the stripper clip to move downward, and the clip will catch on the top edge of end panel 26, namely, at score line 79 and on inner rib panels 33 and 34. Acting on these panels, it will move the bottom formed container 40 down from the mandrel 17. Stripper clip slot 255 is on mandrel 17, permitting the stripper clip 257 to move along the mandrel without contacting it. When the stripper clip 253 has reached its most downward position, the container will be held by transfer mechanism 260. It should be noted that slot 255 runs the length of the mandrel 17, and this same type of slot could be located on the other four sides of the mandrel. The slot prevents cavitation as the container is being stripped from the mandrel and allows air to flow into the container, permitting easy removal by the stripper clip 253.

The top areas of the transfer mechanism element will be slightly flanged to guide the container 40 into proper position in this mechanism. This can be viewed in FIG. 15. Support member 278 is secured to machine base 10'. Post 276 is rotatably housed in support member 278 and has support block 268 rotatably mounted on it. Transfer arm 266 is secured to the support block 268. The transfer arm 266 is made up of a transfer flange 267, a transfer guide 265, and a transfer corner support 264. Also, mounted on the support block 268 is gripper arm pivot 273. The gripper arm pivot is stationary with respect to the block 268 and rotates with it. Gripper arm 271 is rotatably connected to the gripper arm pivot 273 and has a gripper flange 274 between transfer arm 266 and gripper arm 271. It is continually urging gripper arm 271 in a counter-clockwise direction about gripper arm pivot 273, as viewed in FIGS. 17 and 17a. Adjustment member 272 is secured to the gripper arm 271 and controls the maximum counter-clockwise rotation about gripper arm pivot 273 of the gripper arm 271.

Support post 279 is secured to support member 278. The support post is stationary and has two adjustable members secured to it. One is gripper arm release stop 277, the other is stop member 269. Stop member 269 acts on support block 268, limiting its rotation in the clockwise direction about post 276. Gripper release stop 277 acts on the opposite end of gripper arm 271 with respect to the flange 274. This causes the gripper arm 271 to rotate in a clockwise direction with respect to the gripper arm pivot 273 by compressing spring 275.

*Top closing assembly*

FIG. 17 shows the system when the transfer mechanism is in position to receive container 40 from the mandrel 17. As the mandrel 17 has container 40 stripped from it, the container will be positioned in transfer arms 266, and the gripper arm 271 will act on the score line 53 and corner support 264 will act on the score line 51. It should be noted here that these are the two score lines which were used in the loading mechanism. Again, we are utilizing the natural tendency of the container, to want to go flat, to have the best control on the container for transfer. After the container 40 is positioned on the transfer mechanism 260, the stripper cylinder 261 will be activated to raise the stripper clip 253 back to its up position so it will be in a position to strip the next container 40 when it arrives.

With the container 40 on the transfer mechanism 260, the rotating pivot 276 is rotated, moving with it support block 268 and its associated parts. The pivot 276 will rotate until the container 40 has arrived at the receiving station 107. Just before arriving at this position, the gripper arm release stop 277 will act on gripper arm 271, rotating it in a counter-clockwise direction about gripper arm pivot 273 causing the gripper flange 274 to be removed from contact with the container's score line 53. This will permit the container 40 to be removed from the transfer mechanism when the rotating outer housing 281 is indexed, moving the container 40 to top breaker station 108. The container 40 will be resting on flange 267, which is slightly higher than support platform 282. As the rotating outer housing 281 rotates, pusher members 283 will act upon the container 40 and remove it from the flange 267 so that it will move onto support platform 282. It will be guided into the proper position on platform 282 by guide members 284.

As the rotating outer housing continues to rotate, the container 40 will be acted upon by transfer guide 265, which will move it into the guide member 284, and also move it in so that guide rod 285 can take over and guide the container as it rotates with the outer housing 281. The container 40 will be rotated next to top prebreaking station 108. The prebreaking station 108 is not shown in detail but will operate on the top closing panel in a similar manner shown in U.S. Patent No. 3,241,291 and assigned to the assignees of the subject application. The top closing assembly 20 will continue to rotate and will move the container 40 to fill stations 109 and 110. At these stations the container 40 will be filled in a manner not shown in detail here, but a typical method is discussed and disclosed in detail in U.S. Patent 3,002,540, which issued Oct. 3, 1961. The unit will continue to rotate, indexing to dwell station 111. It will next index and move through heat stations 112, 113 and 114.

Referring generally to FIGS. 18 and 19, the top heating unit 11 will be discussed in detail. Machine base flange 291 is secured to and part of machine base 10'. Top heater cylinder 293 is rotatably attached to the machine base flange by cylinder support pin 292. At the opposite end of the cylinder 293, we have top heater rod 294 extending from the cylinder. Attached at its end is top heater support arm 301. The top heater support arm 301 is attached to the top heater rod 294 and is rotatable with respect to it by rod support pin 295. At one end of the top heater support arm 301 is support pin 302, which rotatably connects the support arm 301 with the top heater support member 304 which is secured to and part of machine base 10'. At the opposite end of the top heater support arm 301 is top heater housing 305. Electric line 308 goes into the top heater housing 305 and connects to top heater elements 307. The heater elements are supported by the top heater housing 305 and extend down from it to act on the top sealing panels and flaps of container 40. Top heater shield 306 is supported by the top heater elements and above their bottom elements to direct their heat towards the container 40.

Guide rods 285 act on roof panels 23 and 24 of the container 40 to move them toward each other and to space them with respect to the heating elements so the proper areas will be heated to provide a properly sealed container 40. The top heater cylinder 293 can be actuated either manually or automatically. The cylinder 293 can be operated by pushing a switch located on the operator control box 15, or it can be operated automatically when the machine is shut off to retract it from the containers so as not to ignite the paperboard when the machine is not operating. When the cylinder is actuated, it will move heater rod 294 to the retracted position. As it moves to the retracted position, the top heater support arm 301 will be rotated about support pin 302 in a counter-clockwise direction with respect to top heater support member 304. This will cause the top heater housing and its associated parts to move to retracted position, shown in phantom in FIG. 18. The top heater cylinder 293 will rotate both at rod support pin 295 and cylinder support pin 292.

Referring now to FIG. 19, we can see the container as it passes under the stations 112, 113 and 114. This is taken as seen from above. Side heater element 311 will heat directly on the inside surfaces of outer rib panels 35 and 36 causing their thermoplastic surfaces to become activated so that a good seal may be made when they are joined subsequently at the sealer station. Chevron heater elements 312 will act on one end of the container, namely, the inside and outside surfaces of inner rib panels 34 and 33. A complete description of the top closure panels and the method of applying heat is disclosed in copending application 226,837, filed Sept. 28, 1962.

As the container 40 moves to station 113, it will stop under similar elements, such as side heater elements 311 and chevron heater elements 312, where the above mentioned panels will again be heated directly. It is of course understood that the other panels are receiving heat also, but not in such a direct manner. Container 40 will then be indexed from heat station 113 to heat station 114.

It should be noted that the guide rods 285, which may be water-cooled, are converging all along its path as they pass through station 112 to station 114. When container 40 arrives at station 114, the outer rib panels 35 and 36, and sealing flaps 38 and 39 are in close proximity to each other. At this station we have a final top heater element 313 which continues to apply heat heat to the top closing flaps and panels to maintain the thermoplastic in an activated state when the container arrives at sealing station 115. At the sealing station 115, the top flaps and panels will be sealed together under pressure, thus completing the forming and filling of the container 40. The container will then be indexed to the discharge station 116, which will discharge the container 40 onto a discharge disc table 22.

Generally referring to FIG. 20, the sealing station 115 will be explained in detail. Top sealing support 321 is secured to and part of machine base 10'. Secured at the top of sealing support 321 is top bonding cylinder 322, which is rotatably secured to the support 321 by top bonding cylinder pivot 323. At one end of the cylinder 322 is top sealing rod 324, which is rotatably connected to main pressure arm 329 by rod pivot 326. The rod pivot arm 329 is connected to the top sealing support 321 by stationary pressure pivot 328. Rotatably connected to main pressure arm 329 is first connecting arm 332 by first connecting pivot 331. First connecting arm 332 is rotatably connected to first pressure head support 334 by first moving pivot 333. The first pressure head support 334 is rotatably connected to the top sealing support 321 by first stationary head support pivot 338. The second connecting arm 342 is rotatably connected to one end of the main pressure arm 329 by second connecting pivot 341. The second connecting arm 342 is rotatably connected to the second pressure head support 344 by second moving pivot 343. The second pressure head support 344 is rotatably connected to top sealing support 321 by second stationary pressure head support pivot 348. The first pressure head 336 and second pressure head 346 are rotatably connected to first pressure head support 334 and 344 respectively.

The first roof panel pad 361 and second roof panel pad 351 are rotatably connected to first pressure head support 334 and second pressure head support 344 respectively. The first roof surface guide 362, first rib panel pressure surface 363, and first sealing flap pressure surface 364 are surfaces on first pressure head 336. The second roof surface guide 352, second rib panel pressure surface 353, and second sealing flap pressure surface 353 are surfaces on second pressure head 346.

Referring to FIG. 20, the position shown in phantom is the open position when the container is being indexed into sealing station 115. The solid line position is when the container 40 is being acted on by the sealing station 115 so as to seal the top roof panels and flaps together. To move the system from the open position to the closed position, whereby the container surfaces can be moved together, top sealing cylinder 322 is activated so as to extend top sealing rod 324, thus rotating main pressure arm 329 in a clockwise direction about stationary pressure pivot 328. This will cause first connecting pivot 331 and second connecting pivot 341, to rotate about the pivot 328 in a clockwise direction.

Trailing the linkage through, it will cause first and second pressure pads to move toward each other and toward the container's top sealing flaps. The first roof pad guide 361 and the second roof pad guide 351 will act on roof panel 23 and 24, respectively. As the pressure heads 336 and 346 continue to move forward, first and second roof surface guides 362 and 352 will act on roof panels 23 and 24 respectively, near score line 37. As heads 336 and 346 continue to move forward, they will come together, and first and second rib panel pressure surfaces 363 and 353 will act on outer rib panels 35, inner rib panels 31 and 34, outer rib panel 36 and inner rib panels 32 and 33, respectively. First and second sealing flap pressure surfaces 364 and 354 will act upon sealing flaps 39 and 38, respectively. This will cause the container flaps to be sealed together as the pressure will remain momentarily.

Before indexing to discharge station 116, the sealing station 115 will be opened. The guide rods 285 will be straight, causing the container 40 to be pushed onto disc discharge table 22, which is rotatably mounted on shaft 370. At the time the machine is indexed, the next container will be forced onto the disc discharge table 22 by guide rods 285 and will push the first discharged container 40 around on disc discharge table 22. The operator from his load position, may remove the containers from the table 22 as they are discharged. The constructed, filled and sealed container then emerges in finished form from the machine.

While the embodiments of the present invention as herein disclosed constitute a preferred form, it is to be understood that other forms might be adopted.

We claim:
1. In a container fabricating machine a container top heating mechanism comprising:
 (a) a support;
 (b) a cylinder mounted on said support and having a movable piston rod;
 (c) a support arm pivotable by said piston rod;
 (d) a top heater mounted on said support arm;
 (e) a shield adapted to concentrate heat from said top heater onto the appropriate sealing flaps of a container;
 (f) means for conveying containers under said top heater;
 (g) gradually converging guide rods adapted to cause said sealing flaps to be brought in close relative proximity;
 (h) means adapted to control said cylinder to normally maintain said top heater close to said container sealing flaps;
 (i) means adapted to control said cylinder to retract said top heater when said container fabricating machine is stopped; and
 (j) said heater comprising:
  (1) first heater elements adapted to heat directly the inside surfaces of the outer rib panels of said container; and
  (2) second chevron shaped heater elements adapted to heat directly the inside and outside surfaces of the inner rib panels of said container.

2. A transfer mechanism for a container fabricating machine and adapted to transfer bottom formed containers from the mandrel assembly to the top closing assembly, said apparatus comprising:
 (a) a mandrel mounted on said mandrel assembly and extending down from it;
 (b) a transfer mechanism below said mandrel;
 (c) a means for removing one container at a time from said mandrel and placing it in said transfer mechanism;
 (d) gripping means as part of said transfer mechanism to support said container;
 (e) means for rotating said transfer mechanism with said container and positioning said container at said top closing assembly, and
 (f) means on the top closing assembly for removing the container from the transfer mechanism.

3. In a machine for fabricating containers a container pressure sealing mechanism for sealing the top closure of thermoplastic coated containers comprising in combination:
 (a) a support;
 (b) a cylinder pivotally mounted on said support and having a reciprocable piston rod operable to travel in a vertical plane transverse to the sealing flaps of the closure;
 (c) a main pressure lever arm fulcrumed on said support above the closure and pivotally linked at its upper end to said piston rod for movement in the vertical plane of said piston rod;

(d) a first pressure head pivotally mounted on said support and linked to said lever arm above its fulcrum point by a first connecting arm wherein said first pressure head is adapted to contact one side of the container sealing flaps to be sealed;

(e) a second pressure head pivotally mounted on said support and linked to said lever arm below its fulcrum point by a second connecting arm wherein said second pressure head is adapted to contact the other side of the container sealing flaps to be sealed; and (f) said piston rod operative for moving said first and second pressure heads simultaneously into and away from the sealing flaps of the closure.

4. The mechanism as defined in claim 3, wherein a pair of container roof pad guides on said support for supporting the container roof panels while said first and second pressure heads are in contact with the sealing flaps of the closure.

References Cited
UNITED STATES PATENTS

| | | | |
|---|---|---|---|
| 2,575,544 | 11/1951 | Zinn | 53—373 X |
| 2,677,220 | 5/1954 | Fischer et al. | 53—375 X |
| 2,863,267 | 12/1958 | Moore | 53—39 X |
| 3,002,328 | 10/1961 | Monroe et al. | 53—373 |
| 3,115,736 | 12/1963 | Peterson | 53—371 |

WILLIAM W. DYER, JR., *Primary Examiner.*

TRAVIS S. McGEHEE, *Examiner.*

R. J. ALVEY, *Assistant Examiner.*